INVENTOR
J. C. E. MITCHELL
BY H. S. Grover
ATTORNEY

July 11, 1950 J. C. E. MITCHELL 2,515,052

RESTORING DEVICE FOR LOCKING CIRCUITS

Filed April 4, 1946 2 Sheets-Sheet 2

INVENTOR
J. C. E. MITCHELL
BY H. S. Grover
ATTORNEY

Patented July 11, 1950

2,515,052

UNITED STATES PATENT OFFICE 2,515,052

RESTORING DEVICE FOR LOCKING CIRCUITS

John C. E. Mitchell, Montreal, Quebec, Canada, assignor to Radio Corporation of America, a corporation of Delaware Application April 4, 1946, Serial No. 659,477

7 Claims. (Cl. 178—70)

In this application I disclose improved circuits of the type having two conditions of stability known in the radio and allied arts as a locking circuit or triggering circuit or flip-flop circuit. The circuit involved may be of the general type disclosed in Finch U. S. Patent #1,844,950, and is of wide use in the radio art.

These locking circuits have two electron discharge systems with their electrodes so coupled that when one discharge system starts to draw current, current is switched through said one system and cut off in the other tube, and this condition of stability remains until something takes place to start current through the said other discharge system so that current is switched therefrom and cut off in the first system. This second condition of stability remains until something takes place to reestablish the first condition. Usually the locking circuits are controlled by application of a potential of pulse energy either alternating current or direct current of varying magnitude to an electrode of one or both discharge systems. The output of the locking circuit, which is considerably stronger than the control potential and is of better wave form, may be used as desired. In a particular application the locking circuit output is used in a telegraphy system to operate a tone keyer or a teletypewriter or other recording means. Such an arrangement is disclosed in my U. S. application Serial #670,085, filed May 16, 1946, now Patent #2,507,730, dated May 16, 1950, and in Cohoon abandoned U. S. application Serial #649,343, filed February 21, 1946. In these systems in order to derive strong signals of improved wave form a locking circuit or two locking circuits in cascade are controlled by pulse energy representing signals. The locking circuits are triggered between their two conditions of stability in accordance with signals and a potential is taken from the locking circuit output and used to operate a teletypewriter or tone keyer or other recording apparatus. The control pulses for the locking circuit may be derived from on and off telegraphy transmission or on-off facsimile transmission or from frequency shift telegraphy signals or facsimile signals. In both these types of signals at the receiver detection takes place to derive pulse energy the magnitude of which varies usually between two values, (may be of reversible polarity), one representing marking condition, the other representing spacing condition.

In telegraphy systems of this type the transmission is synchronized with the receiving mechanism to this extent. The transmission usually ends in the marking condition so that the receiver output pulse energy at the end of the message, and between elements of a message and letters of a message, is of a magnitude such as to represent the marking condition. When the received signals are used to operate a teletypewriter directly or through tone keyers the teletypewriter mechanism obviously should also be arranged to stop operation after excitation by pulse energy representing the marking condition and to start operation on receipt of pulse energy of the magnitude representing space condition in the telegraphy system. The locking circuit, as stated above, is controlled between its two conditions of stability by the received signals and its operation is so related to the teletypewriter and to the signal pulse magnitude that it is left in one condition of stability by reception of pulse energy of a magnitude representing marking condition and in the other condition of stability on reception of pulse energy of a magnitude representing space signal condition. In practice at the termination of a message or between letters or signal elements the locking circuit may for some reason be left in the mark condition, or, may be tripped to the space condition by pulse energy resulting from static interference or from noise developed in the transmitter or receiver. Then the locking circuit is left in space condition instead of in mark condition, as desired. In the seven unit code system now in wide use in the radio art the first code element starts the typewriter distributor. The next five signal elements are for message purposes and the seventh signal element stops the distributor. Moreover, the teletypewriter distributor is started each time a signal character representing space is sent and is stopped usually by a stop character representing mark which is sent, but it may be arranged to stop itself. In any event, the distributor started by a space condition in the locking circuit must go a complete cycle before it is stopped. Now since a noise element representing space has tripped the locking circuit to space condition, the teletypewriter distributor will "race" or start rotating at a fixed speed. Once it is started it must complete a revolution before it is stopped. If the locking circuit is still on space the distributor will again start and repeat its cycle. The system is then out of control as far as the operator is concerned. Obviously no recording or improper recording takes place and the printer will "race" until a pulse of a magnitude representing marking condition is received on the system and applied to the locking circuit to trip the same to mark condition and then the printer-distributor will come to rest and remain in a quiescent condition until a signal again trips the locking circuit to the "space" condition.

The object of the present invention is to provide in locking circuits of this general type means to return or restore the locking circuit to the mark condition in the event that it is either left on space at the conclusion of a teletype signal or that a noise burst, in the absence of teletype signal, trips the locking circuit to space by unwanted or spurious noise energy resulting in pulse energy of a magnitude sufficient to actuate the locking circuit. Means is also included for delaying this restoring action so that the restoring action does not interfere with normal signalling, i. e., does not take place quickly enough to be operated by space characters making up the signal. The "mark return" circuit of the present invention provides a pulse to return the locking circuit to mark condition shortly after the unwanted pulse is received. My invention serves substantially the same purpose as the locking circuit restoring means of Atwood et al. U. S. application Serial #618,760, filed September 26, 1945. Of course in both cases a carrier is assumed to be present, although it may have faded severely.

In some prior locking circuit restoring arrangements tube means and circuit element connections are also used to restore the locking circuit to one of its conditions of stability. However, in these arrangements two factors control the operation of the restoring circuit. One is the space teletype signal or, in its absence, space directed noise, and the other is the condition of the locking circuit. It may be seen that control of the restoring circuit by space directed noise can be a distinct disadvantage. The space directed noise pulses disable (bias off) the restoring circuit in the same way as do space signals, so that in the case where there are a succession of space directed noise pulses it is necessary that the restoring tube wait until this accumulated bias has leaked off before it can trip the locking circuit to mark. Furthermore, it is necessary that the charges from a previous teletype signal leak off before the restoring circuit can operate on the receipt of a new space directed noise. Furthermore, it is extra sensitive to the first space signal, and this sensitivity also enhances the possibility of the locking circuit being tripped in response to a space directed noise pulse.

A further object of my invention is to provide an improved but simple means for restoring the locking circuit to one condition of stability wherein there is only one factor controlling the operation of the mark return circuit and that is the condition of the locking circuit (mark or space). Should the locking circuit be tripped to space the restoring circuit immediately comes into effect, and if the locking circuit remains on space for the prescribed length of time the restoring circuit will trip the locking circuit back to mark. This exactly fulfills the object of the invention.

In the description given above and in the description which follows it is assumed that the transmitted signal ends on mark and that the locking circuit then is in a particular condition of stability and that the printer distributor is started by a space condition. It will be obvious that the invention is equally applicable if the transmission is caused to end on space and the printer starts on mark. Obvious changes such as reversal of the locking circuit response, etc., are then made.

In describing my invention in detail reference will be made to the attached drawings wherein Fig. 1 illustrates by circuit element and circuit element connections an embodiment of a locking circuit with restoring means arranged in accordance with my invention;

Figure 1:
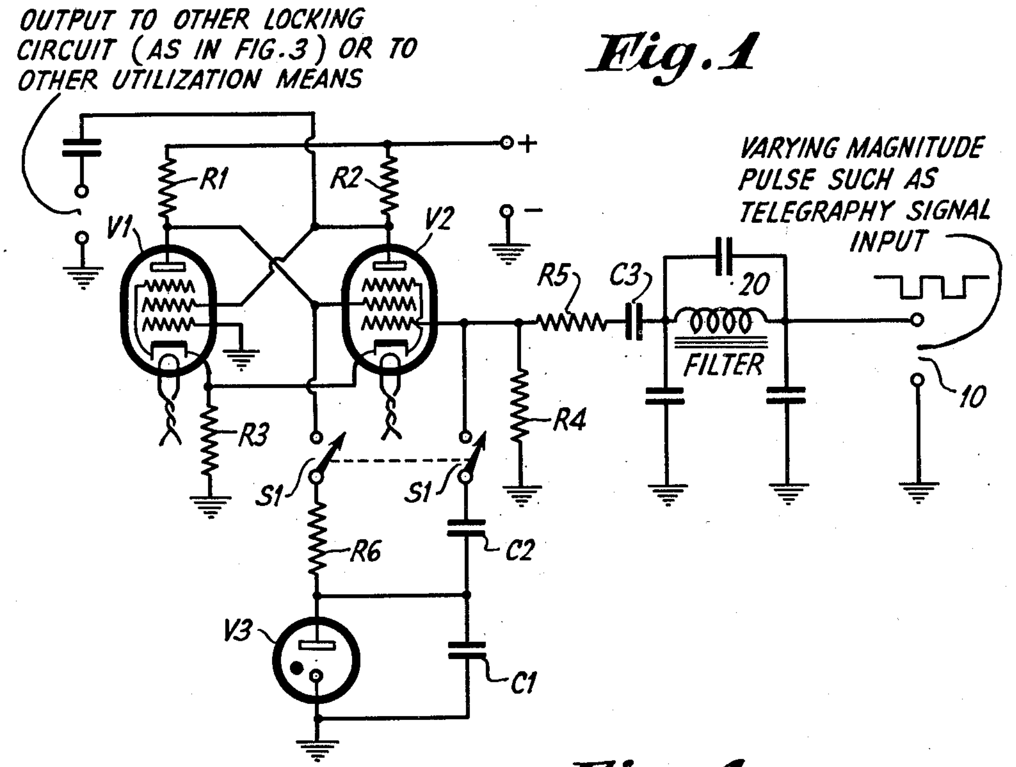

In the drawings, tubes or electron control devices V1 and V2 are connected in a locking circuit. In this circuit the anode of tube electron discharge device V1 is coupled to the screen grid of electron discharge device V2, while the anode of tube V2 is coupled to the screen grid of tube V1. The anodes of tubes V1 and V2 are connected by resistors R1 and R2 respectively to the positive terminal of a source of potential the negative terminal of which is grounded. The tubes have their cathodes tied together and connected to ground by a resistance R3. The suppressor grids are connected to the cathodes. The circuit as described is in principle as disclosed in Shenk abandoned U. S. application Serial #580,525, filed March 2, 1945. The arrangement is such that when the potential on the control grid of say tube V2 is made more positive current starts to flow in tube V2 and the potential at the anode of tube V2 drops so that the potential on the screen grid of tube V1 becomes less positive to reduce current flow in tube V1 and the action is cumulative to the extent that tube current flow is all switched through the tube V2 and cut off in the tube V1. The locking circuit is then in one of its conditions of stability and remains there until, for some reason, usually application of a potential to an electrode of one of the tubes, starts the current to flow in V1 or reduces current flow in V2 so that the action described above is repeated in a reverse sense to switch the current all through tube V1 and cut off current flow in tube V2.

The locking circuits as described above are of wide application in the radio art. The locking circuits are particularly applicable to telegraphy signalling and are put to many uses in the telegraphy art. For example, they are used between the telegraphy receiver demodulators and the recording apparatus. The locking circuit is then excited by the telegraphy signals taken from the output of the demodulator and operates the recorder either substantially directly or by way of a tone keyer. In some cases two locking circuits are cascaded. Two examples of such use are shown in Schock et al. U. S. application Serial #632,978, filed December 5, 1945, and in Peterson et al. application Serial No. 629,298, filed November 17, 1945, now Patent #2,494,309, dated January 10, 1950. When so used telegraphy signals may be impressed on the terminals 10 and may be of the wave form shown over the input leads. Since they are obtained by rectifying frequency shifted currents of intermediate frequency or keyed telegraphy signals they may include undesired components in which case they may be passed through a filter 20 to remove therefrom alternating components of frequency higher than the keying frequencies. They are then supplied to a relatively large capacitor C3 and fed from the capacitor C3 through a resistor R5 to the control grid of tube V2. The control grid of tube V2 is biased as desired by a resistor R4 connecting the control grid to ground. The varying pulses at 10 operate as described above on the control grid of tube V2 to make the same conductive or non-conductive thereby also making tube V1 non-conductive or conductive. The output may be taken from various points in the locking circuit. In the embodiment shown the output leads are coupled to the anode of tube V2. The potential across the anode resistor R2 varies in magnitude as current is switched between tubes V1 and V2. Current is switched between V1 and V2 in accordance with signals so that at the output there is a potential which varies between two substantially fixed values in accordance with signals. This potential may be utilized as desired to operate signal recording apparatus. For example, it may be used as disclosed in Cohoon U. S. application Serial #649,343, filed February 21, 1946, to control the potential on the grid of one of the tubes of a second locking stage which in turn operates a teletypewriter relay.

In order to simplify the description it will be assumed that in mark condition the tube V1 is conductive and tube V2 is non-conductive, and that in space condition tube V1 is non-conductive and tube V2 is conductive. It will be understood, however, that these conditions of stability of the system may be changed as desired. Furthermore, it will be assumed that the signal transmission ends on mark condition so that the pulses at the input 10 are negative and of a magnitude such as to trip the tube V2 to a non-conductive state, i. e., on mark condition the signal is more negative than on space condition. It is further assumed that signal transmission starts on space.

If after a mark pulse has been applied to the control grid of tube V2 to trip the circuit into marking condition of stability with tube V1 conductive, noise or static produces at the input 10 a pulse which is of a magnitude such as represents spacing signal, the tube V2 is made conductive and tube V1 non-conductive, i. e., the system will be tripped to the space condition instead of the mark condition. The gist of my invention is means for restoring the locking circuit to the mark condition in the event static or noise energy has tripped this circuit to space condition. This means comprises an electron discharge voltage regulator device V3 which may have its cathode electrode connected to ground and thereby to the cathodes of tubes V1 and V2 and its anode electrode connected by resistor R6 through a switch S1 to the anode of tube V1 which is also to the screen grid of tube V2. The internal impedance of this gas tube is shunted by condenser C1 and the anode of this tube is coupled by a condenser C2 and another contact of the switch S1 to the control grid of the tube V2.

In operation with switch S1 in the open position as shown the locking circuit operates as described above, i. e., in a normal manner. This locking circuit will lock on either mark or space, depending on the magnitude of the incoming signal pulses until a signal pulse of the opposed polarity is received. By opposed polarity applicant includes any signal the magnitude of which changes with reference to a base value. Now if the switch S1 is closed the gas discharge tube V3 is connected in shunt to the anode to cathode impedance of tube V1, i. e., it is connected across the high potential direct current source and across the anode to ground impedance of tube V1. The breakdown potential of the tube V3 is of a value intermediate the potentials appearing at the anode end of resistance R1 in the two different conditions of stability of the locking circuit, i. e., when tube V1 is conductive and when tube V1 is non-conductive. In an embodiment operated the breakdown potential of the tube V3 is approximately 105 volts D. C., and the voltage drop across the tube V3, i. e., between its anode and ground is equal to about 75 volts D. C. when the tube is fully conductive.

Recall that in mark condition tube V1 is conductive and the potential at its anode is low, say 20 volts, and that this is the mark condition at which the locking circuit is supposed to come to rest. Static or other noise may then trip the locking circuit so that the tube V1 becomes non-conductive and the voltage at the plate of tube V1 and the screen grid of tube V2 rises and reaches a positive value above the breakdown voltage of tube V3, say 120 volts positive. If the locking circuit rests on space for an appreciable length of time condenser C1 then charges up to a potential sufficient to breakdown tube V3, i. e., charges up to about 105 volts. The potential across tube V3 drops substantially instantaneously to say 75 volts positive, which is the drop across the tube V3 when it is fully conductive. This sudden drop in potential at the anode end of tube V3 applies through condenser C2 and switch S1 to the control grid of tube V2, a pulse of energy which is negative and of a magnitude sufficient to reduce current flow in the tube V2 and start the tripping or locking action described above to switch the current through V1 and cut off current in tube V2. In other words, the pulse of potential developed across tube V3 when the same breaks down and applied to the grid of tube V1, trips the locking circuit to the mark condition at which it is to rest at the end of a message or between signal elements. Under the mark condition the voltage at the plate of tube V1 and at the screen grid of tube V2 is low, say only about 20 volts. Tube V3 which became conductive, has drained off the charge from condenser C1 to the point at which tube V3 becomes non-conductive. The mark condition restoring tube V3 and its connections are then again ready to restore the circuit to mark condition if the same is tripped to the space condition by unwanted pulses and remains in the space condition for a period of time greater than that which elapses between mark and space during normal signal conditions.

Figure 4:
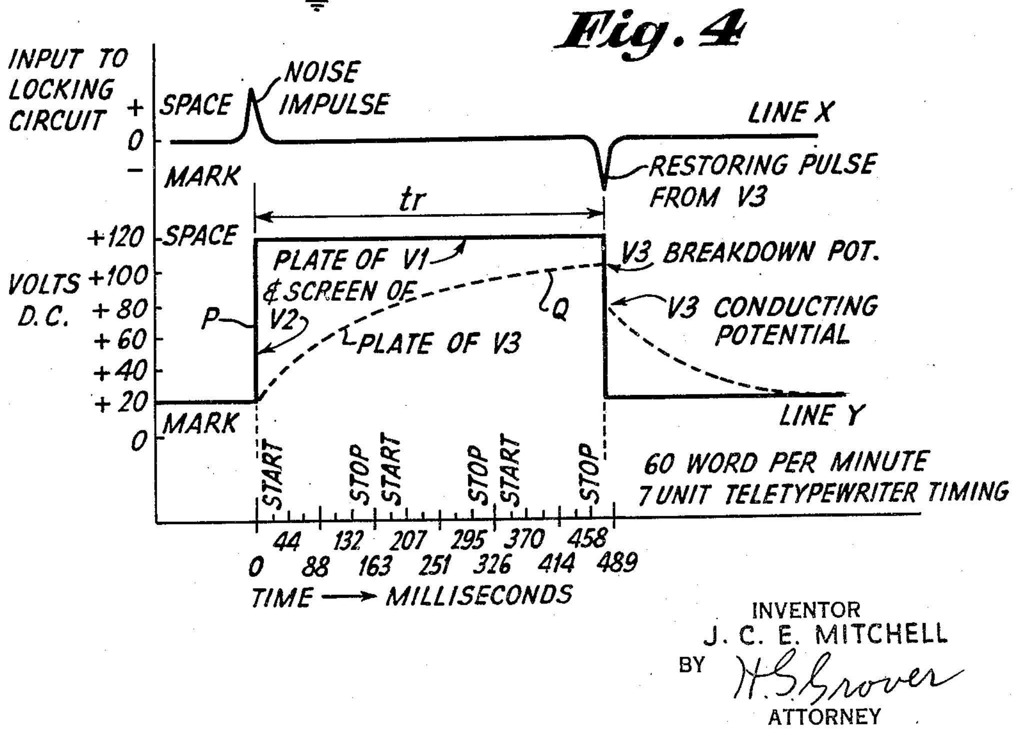
Fig. 4 illustrates by voltage time curves the operation of my improved trigger restoring circuit.

My mark return circuit V3 and components may be considered as a relaxation oscillator which is supplied with adequate voltage for its operation if the locking circuit remains on space. The first pulse of the relaxation oscillation, being fed to the grid of the locking circuit, restores the locking circuit to mark and disables the oscillator. V3 and components may also be considered as a form of relaxation oscillator when sufficient noise is present to tend to keep the locking circuit on space. In this case it will continue to produce new mark pulses at approximately its relaxation oscillation rate until the noise ceases. Because this mark return circuit takes the form of an oscillator it is possible to adjust its relaxation time in such a way that it does not cause the teletype to print a character when the locking circuit is returned to mark following a space directed noise pulse. This is the case if the locking circuit is returned to mark during a stop interval on the teletypewriter. This is shown in Fig. 4.

The values of R6 and C1 are chosen in relation to the breakdown voltage of tube V3 so that condenser C1 will not charge to the breakdown voltage during the longest space which normally exists during telegraphy transmission. This is of the order of 125 milliseconds. The time constant of C1 and R6 is chosen to be about 220 milliseconds to allow for a partial charge of the condenser C1 during normal telegraphy transmission. During normal transmission of teletype signals the average voltage across C1 is less than 105 volts and the circuit is inoperative. C1 is chosen to provide adequate voltage for tripping the locking circuit.

A main advantage of this circuit over known circuits is that this circuit cannot be rendered temporarily inoperative by rapidly successive noise pulses of a space sense. In one restoring circuit tried out space noise pulses occurring immediately after the mark return circuit has functioned, could by returning the locking circuit to space condition render the mark return circuit temporarily inoperative. My improved circuit operates directly after each appearance of one or a succession of pulses representing space condition of a duration greater than approximately 125 milliseconds.

Figures 2, 3:
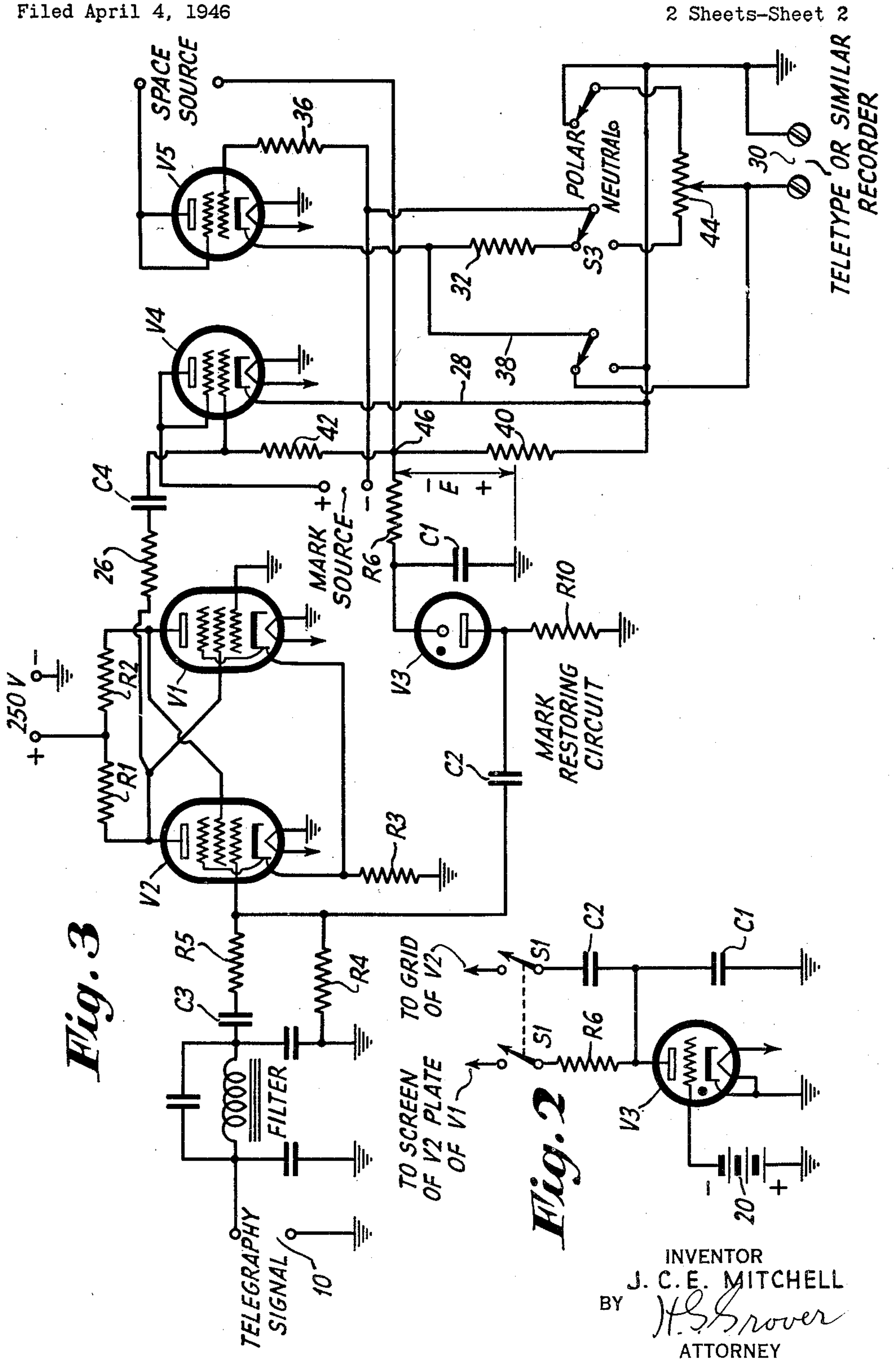
Figs. 2 and 3 illustrate modifications of the arrangement of Fig. 1.

The arrangement of Fig. 1 may be modified as illustrated in Fig. 2. In the embodiment of Fig. 2 the tube V3 is a gas thyratron and is in a circuit which is broadly similar to the arrangement of Fig. 1 and may be considered a relaxation oscillator set into operation on application to the locking tube circuit of a pulse of energy due to noise or static disturbance of space signal magnitude so that the resistor R6 supplies to the anode of tube V3 a breakdown potential of a duration long enough to charge up condenser C1 so that this anode potential becomes effective to make tube V3 conductive. The tube V3 is a gas tube of the control grid type with the control grid biased negative by a source 20. The plate of the tube is connected by switch S1 as in Fig. 1 to the plate of tube V1 and screen grid of tube V2. The drop in potential across the tube V3 is applied over condenser C1 through condenser C2 and switch S1 to the grid of tube V2, and is in a negative direction and of sufficient magnitude to have the same effect as application of a marking pulse to this grid to trip the locking circuit to marking condition whereat tube V2 is non-conductive and tube V1 is conductive. In operation then oscillation takes place or is permitted in the relaxation oscillator including tube V3 when its plate voltage rises to a value which allows plate current to flow. The plate voltage rises when tube V1 is non-conductive for a period of time greater than that measured by marking elements in a normal signal. The grid bias of tube V3 applied by source 20 determines or measures the magnitude of the plate voltage at which current will flow in tube V3. The condenser C1, as in the embodiment of Fig. 1, measures the time necessary for application of voltage before the tube V3 becomes conductive. Operation is otherwise similar to that of the tube V3 in Fig. 1.

The potential applied to resistance R6 may be obtained from other points than the plate of tube V1 and the screen of tube V2. For example, this potential may be derived from a proper cathode resistor, for example, resistance 40 of Fig. 3, in the second locking circuit driven by the locking circuit shown. The voltage is selected from a point where a voltage greater than the breakdown voltage of tube V3 is available. If the polarity of the voltage applied to the resistor R6 is negative, as might be the case in some applications, C2 may then be connected to the grid of tube V1 by lifting the grid of tube V1 off ground direct current potential and returning it to ground through a suitable resistor. This of course requires reversal of the polarity of tube V3. Then when the undesired pulse has tripped the circuit to space condition after an adjustable period of time the condenser C1 charges and tube V3 breaks down and the high negative potential on its cathode drops to be less negative and a rising potential is applied to the grid of tube V1 to turn it on thereby tripping the entire system to the mark condition as desired.

Another version is to introduce a resistor in series with the grounded terminal of tube V3 and connect the junction point of tube V3 and the said resistor directly or through a condenser resistor combination to the grid of tube V2. This embodiment may be as illustrated in Fig. 3.

Such an arrangement is illustrated in Fig. 3 of the drawings. In this embodiment the tubes V1 and V2 are connected and operated substantially as described hereinbefore in connection with Figs. 1 and 2. A second locking circuit including tubes V4 and V5 is driven by voltages derived from the first locking circuit including tubes V1 and V2. To do this the control grid of tube V4 is connected by a resistor 26 and condenser C4 to the anode of tube V2 and screen grid of tube V1. The locking circuit including tubes V4 and V5 is substantially as described in Cohoon U. S. application Serial #649,343, filed February 21, 1946. Separate anode sources are used for the two tubes. The anode circuit of the tube V4 runs from the positive terminal of the mark source through the tube to the tube cathode and thence by lead 28 to the teletypewriter or similar recorder coupled to the leads 30 and back through switch S3 and resistor 32 to the negative terminal of the source. The potential drop developed in the resistance 32 is applied to the control grid of tube V5 by resistor 36 to cut this tube off in the usual locking circuit fashion when tube V4 is conductive.

The anode direct current circuit of the tube V5 flows from the positive terminal of the "space source" to the anode of tube V5 and from its cathode by lead 38 and switch S3 through the teletypewriter connected to terminals 30 (in the opposite direction) back through the resistor 40 to the negative terminal of the "space source" or space battery. The potential drop developed in the resistor 40 is applied by resistor 42 to the grid of the tube V4 when tube V5 is conductive to cut off tube V4 in the usual locking circuit fashion.

Since the tube V2 is non-conductive on mark, i. e., has its maximum anode potential, the tube V4 which has its grid excited by this anode potential is conductive on mark, and its plate source has been designated the "marking source" because current supplied thereby runs through the recording apparatus to operate the same. The tube V5 is then non-conductive. When the tube V2 is conductive, i. e., in the space condition, tube V4 is non-conductive and tube V5 is conductive and the plate source for this tube is designated the "space-source" because then current from this source runs in the opposite direction through the recording circuits. The switch S3 is shown in what is termed the polar position, i. e., in the position described wherein when current flows through V4 it passes in one direction through the recording means connected to the terminals 30, and when current flows through tube V5 it passes in the opposite direction through the recording means connected to the terminals 30. The adjustable resistance 44 is a means for adjusting the intensity of the current through the recorder.

It will be noted that when current flows in the tube V5 a potential drop is developed in the resistor 40 which is negative at the point 46 and this potential drop is applied by resistor R6 to the tube V3. Current flows in the tube V5 when the locking circuit including tubes V1 and V2 is in the space condition with tube V2 conductive because, as pointed out above, when V2 is non-conductive V4 is conductive, and when V2 is conductive V4 is non-conductive, making V5 conductive, which is the space condition. Moreover, the potential developed at the end of resistor 40 remote from the cathode of tube V5 is negative and is of a value E (with respect to ground) depending on the current in tube V5 and on the magnitude of the resistor 40. The tube V3 is then connected in reversed polarity with respect to its connections in the embodiment of Figs. 1 and 2. That is, tube V3 now has its cathode at a high negative potential with respect to ground and its anode connected to ground through a resistor R10. A point between the anode of tube V3 and resistor R10 is connected through condenser C2 to the control grid of the tube V2. Now if noise or a mutilated message has left or tripped the tube V2 to the space condition when it should be left in mark condition, current will flow in tube V2 to cut off current in the tube V4 and trip current through the tube V5. A negative potential E is developed across the resistor 40 and applied to the cathode of tube V3. The magnitude of this potential E is made sufficient to exceed the breakdown potential or voltage of the tube V3. In one embodiment the potential E is approximately 65 volts so that the breakdown voltage of the tube V3 is made 55 volts or less. If the voltage E is present long enough to charge up condenser C1, tube V3 breaks down to produce in resistor R10 a potential drop which is in the negative direction at the anode of the tube V3 and operates through the condenser C2 to simulate the effect of application of a marking signal to the grid of tube V2. That is, it biases this tube to cutoff, thereby turning on tubes V1 and V4 and turning off tube V5 so that both locking circuits are in the condition at which they are intended to be after the application of a marking character.

The operation of the embodiments described hereinbefore has been further illustrated and described in Fig. 4. In Fig. 4 line X is shown as a voltage versus time curve representing what might be the noise input to the locking circuit, say to tube V2. The noise or static might generate a pulse peak in the space signal direction, i. e., positive and of a magnitude comparable to a space signal. This would trip the locking circuits to the space condition which, as stated above, would prevent proper operation of the recording apparatus synchronized to start on space and end on mark. The apparatus described hereinbefore then produces at V3 a negative peak of a magnitude comparable to a normal marking pulse and applies the same to the control grid of a tube in a locking circuit to make the same effective to trip to the marking condition. The next line Y of Fig. 4 illustrates at P the voltage on the anode of the tube V1 and screen grid of the tube V2 in the space and marking condition, and at Q the potential generated by my locking circuit restoring arrangement at the anode of the restoring tube V3. In both graphs the ordinants are direct current voltages and the abscissas represent time. The curves are, it is believed, self-explanatory, but it is noted that $$tr=RC\log_{\epsilon}\frac{Es-Em}{Es-Vf}\text{ (approximately)}$$

where:

$tr$=relaxation time of V3 mark return circuit
R=R6 in ohms
C=C1 in farads
$\epsilon$=2.7183 base nat. log.
$Es$=space volts } Plate V1
$Em$=mark volts } Screen V2
$Vf$=breakdown voltage of V3

$tr$ may be chosen so that the locking circuit returns to mark during a stop interval on the teletypewriter. In the above case $tr$ is approximately 470 milliseconds, in which case R6 would be 2.5 megohms and C1 0.1 mfd. approximately, with the voltages shown.

If the teletypewriter is returned to mark condition during or very near a stop interval in its cycle it does not print a character, whereas if it is returned at an arbitrary time it generally prints a letter which is of course undersirable.

What is claimed is:

1. In combination, a locking circuit comprising two electron control devices having electrodes intercoupled and connected to direct current sources in such a manner that when current is cut off in one device current flows in the other device and vice versa, apparatus for applying potentials which vary between two magnitudes representing signal elements to said locking circuit to trip the same back and forth between the two conditions of current conduction in the devices as the potentials vary between said magnitudes, and means for reestablishing a stable condition of current cut off in a predetermined one of said devices and current flow in the other of said devices in the event the locking circuit is tripped from said condition of stability and remains tripped for a time period exceeding the duration of the longest signal element, comprising a relaxation oscillator including an electron discharge device in a capacitive and resistive circuit having a time constant which is longer than the time duration of the longest signal element, means responsive to current in said locking circuit for developing a potential of a magnitude sufficient to start oscillation in said relaxation oscillator when current is turned on in said one device and off in the said other device for a time period exceeding the time duration of the longest signal element, means for applying said potential to said electron discharge device, and means coupling said resistive circuit to an electrode in one of said control devices to trip said locking circuit to reestablish said condition of current cut off in said one device and current flow in said other device.

2. In combination, a locking circuit comprising two electron control devices having electrodes intercoupled and connected to direct current sources in such a manner that when current is cut off in one device current flows in the other device and vice versa, apparatus for applying potentials which vary between two magnitudes representing signal elements to said locking circuit to trip the same back and forth between the two conditions of current conduction in the devices as the potentials vary between said magnitudes, means for reestablishing a stable condition of current cut off in a predetermined one of said devices and current flow in the other of said devices in the event the locking circuit is tripped from said condition of stability and remains tripped for a time period exceeding a predetermined time period, comprising a gas tube in a capacitive and resistive relaxation oscillator circuit having a time constant which is longer than said selected predetermined time period, means for biasing said gas tube to cutoff when current is cut off in said one device and for developing a potential of a magnitude sufficient to overcome said bias when current is turned on in said one device for a time period exceeding said predetermined time period, means for applying said potential to said gas tube whereby the condenser of said relaxation oscillator circuit is charged and said gas tube is made conductive, and means coupling said resistive circuit to an electrode in one of said devices to apply thereto a potential which trips said locking circuit to reestablish said condition of current cut off in said one device and current flow in said other device.

3. In a telegraphy system, a locking circuit arrangement including two electron control devices each having electrodes intercoupled and conected by impedances to direct current sources in a manner such that when current flows in one device current is cut off in the other device and vice versa, a source of pulse energy, which varies in magnitude between two values representing two signal conditions, coupled to an electrode of one device to trip the current back and forth between the devices as the magnitude varies between said values, said pulse energy representing signal elements arranged to terminate in the same signal condition so that one device is left in a conductive condition and the other device in a non-conductive condition, means for restoring the terminal condition of said locking circuit in the event static or other disturbance produces a pulse which trips said locking circuit to a condition in which said one device is non-conductive and said other device is conductive and said last condition remains for a time period which exceeds the time period of the signal elements, comprising an electron discharge device having a breakdown potential which is intermediate the limits of the potential variation in one of said impedances, a condenser in shunt to the internal impedance of said discharge device; means coupling said discharge device to said one impedance so that the potential developed in said one impedance is applied to said discharge device, and a coupling between an electrode of said discharge device and a control electrode of one of said control devices.

4. In combination, a locking circuit comprising two tubes each having electrodes including a control grid and an anode intercoupled and connected to a direct current source in such a manner that when current is cut off in one tube it flows in the other tube and vice versa, apparatus for applying potentials which vary between two magnitudes representing signal elements to said locking circuit to trip the same back and forth between the two conditions of current conduction in the tubes as the potentials vary between said magnitudes, means for re-establishing a stable condition of current cut off in a predetermined one of said tubes and current flow in the other of said tubes in the event the locking circuit is tripped from said condition of stability and remains tripped for a time period which is longer than the time duration of any signal element, comprising an electron discharge device with an anode and cathode in a capacitive and resistive relaxation oscillator network having a time constant which is longer than the time duration of any signal element, a coupling between the anode of said other tube and the network for charging the condenser of said network to a potential of a magnitude sufficient to make said device conductive when current is turned on in said one tube and off in said other tube for a time period exceeding the time duration of any signal element, and a coupling between said network and a control grid of said one tube.

5. In combination, a locking circuit comprising two tubes each having electrodes including an anode and a control grid and having their electrodes intercoupled and connected to a direct current source in such a manner that when current is cut off in one tube it flows in the other tube and vice versa, apparatus for applying potentials which vary between two magnitudes representing signal elements to said locking circuit to trip the same back and forth between the two conditions of current conduction in the tubes as the potentials vary between said magnitudes, means for re-establishing a stable condition of current cut off in a predetermined one of said tubes and current flow in the other of said tubes in the event the locking circuit is tripped from said condition of stability and remains tripped for a period of time of a duration longer than any signal element, comprising an electron discharge device having a cathode, an anode and a negative control grid and having its anode and cathode in a capacitive and resistive relaxation oscillator circuit having a time constant which is longer than the duration of any signal element, a connection including a resistance between the anode of said other tube and the anode of said device for applying thereto a potential of a magnitude sufficient to make said device conductive when current is turned on in said one tube and off in said other tube for a time period exceeding the duration of any signal element, and a coupling between said network and the control grid of said one tube.

6. In a telegraphy system, a locking circuit comprising a pair of electron control devices each having electrodes cross-coupled and coupled by impedances to direct current sources such that when current flows in one device current is cut off in the other device and vice versa, a source of pulse energy of varying magnitude coupled to a control electrode of one device to trip the current back and forth between the devices, as the magnitude of said source varies, said pulse energy representing signals arranged to terminate in the same pulse source magnitude so that one device is left in a non-conductive condition and the other device in a conductive condition, means for restoring the terminal condition of said locking circuit in the event energy representing static or other disturbance trips said locking circuit to a condition in which said one device is conductive and said other device is non-conductive for a period of time which exceeds the signal pulse duration, comprising a gas discharge tube having its electrodes shunted by a condenser; means coupling the impedance between the electrodes of said gaseous discharge tube in shunt to a portion of said locking circuit whereat is developed a potential which is higher than the breakdown potential of said gas tube when said one device is left in a conductive condition and said other device in a non-conductive condition, and a connection between an electrode of said gas tube and a control electrode of said one device for applying thereto when said gas tube breaks down a potential which trips said locking circuit to make said one device non-conductive and said other device conductive.

7. In a telegraphy system, a pair of locking circuits each comprising two electron discharge devices having control electrodes and anodes cross-coupled and connected by impedances to direct current sources in such a manner that when current starts to flow in one device it is cut off in the other device and vice versa, a connection between a device of one locking circuit and a device of the other locking circuit to couple the same for cascade operation, an input circuit for applying direct current potential, representing signals, which varies between two values representing different signalling conditions to a control electrode of a device in said one locking circuit to trip the same so that current flows through one device and is cut off in the other device when the direct current potential represents marking condition, means for restoring said one locking circuit to marking condition in the event static or other disturbance trips it to spacing condition for a time period greater than the maximum signal element time period, including an electron discharge device having electrodes shunted by a condenser and connected to an impedance in the circuit of said other locking circuit, and a connection between said last-named device and a control electrode in one of the devices of said one locking circuit.

J. C. E. MITCHELL.

REFERENCES CITED

The following references are of record in the file of this patent:

UNITED STATES PATENTS

| Number | Name | Date |
|---|---|---|
| 1,873,786 | Ranger | Aug. 23, 1932 |

FOREIGN PATENTS

| Number | Country | Date |
|---|---|---|
| 480,708 | Great Britain | Feb. 28, 1938 |